US007158770B2

(12) United States Patent
Hanaoka et al.

(10) Patent No.: US 7,158,770 B2
(45) Date of Patent: Jan. 2, 2007

(54) CHANNEL ESTIMATION METHOD FOR A MOBILE COMMUNICATION SYSTEM

(75) Inventors: Seishi Hanaoka, Kodaira (JP); Takashi Yano, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 561 days.

(21) Appl. No.: 10/600,652

(22) Filed: Jun. 23, 2003

(65) Prior Publication Data
US 2004/0171398 A1 Sep. 2, 2004

(30) Foreign Application Priority Data
Feb. 28, 2003 (JP) ............................. 2003-052234

(51) Int. Cl.
*H04B 17/00* (2006.01)
*H04B 7/216* (2006.01)
*H04Q 7/28* (2006.01)

(52) U.S. Cl. .................... 455/226.1; 370/335; 370/342
(58) Field of Classification Search ................ 455/522, 455/127.1, 127.3, 226.1, 226.4; 370/335, 370/342, 441
See application file for complete search history.

(56) References Cited

U.S. PATENT DOCUMENTS

| 5,329,547 A | | 7/1994 | Ling | |
|---|---|---|---|---|
| 5,737,327 A | * | 4/1998 | Ling et al. | 370/335 |
| 6,034,952 A | * | 3/2000 | Dohi et al. | 370/335 |
| 6,314,131 B1 | * | 11/2001 | Roe et al. | 375/227 |
| 6,456,827 B1 | * | 9/2002 | Kubo et al. | 455/68 |
| 6,507,602 B1 | * | 1/2003 | Dent | 375/142 |
| 6,647,003 B1 | * | 11/2003 | Abeta et al. | 370/335 |
| 6,892,053 B1 | * | 5/2005 | Engstrom | 455/63.1 |

FOREIGN PATENT DOCUMENTS

EP   0 955 741 A1   11/1998

OTHER PUBLICATIONS

Hidehiro Andoh and Mamoru Sawahashi, "Channel Estimation Scheme using the Plural Pilot Blocks for DS-CDMA Mobile Radio", The Institute of Electronics, Information and Communication Engineers, Technical Report of IEICE, RCS96-72, vol. 96, No. 213, Aug. 1996, pp. 45-50.
European Search Report dated Jun. 2, 2004.

* cited by examiner

*Primary Examiner*—Tilahun Gesesse
(74) *Attorney, Agent, or Firm*—Reed Smith LLP; Stanley P. Fisher, Esq.; Juan Carlos A. Marquez, Esq.

(57) ABSTRACT

Under present circumstances, where an increasing number of wireless communication systems employ the QAM method as a modulation method for frequency use efficiency enhancement as the speed of information transmission in the wireless communication systems increases, it is an object of the present invention to provide a channel estimation method for estimating a channel efficiently and accurately and establishing communication at high quality, that is, providing communication with excellent error rate characteristics. To achieve the above object, the present invention improves characteristics by calculating the channel estimation results variously for all data signal symbols and using them for demodulation. To accomplish the object, the present invention also pays attention to the frequency characteristics of fading in a radio propagation path and enhances the accuracy in channel estimation result calculation by using a band pass filter for eliminating the thermal noise that would increase the estimation error.

15 Claims, 16 Drawing Sheets

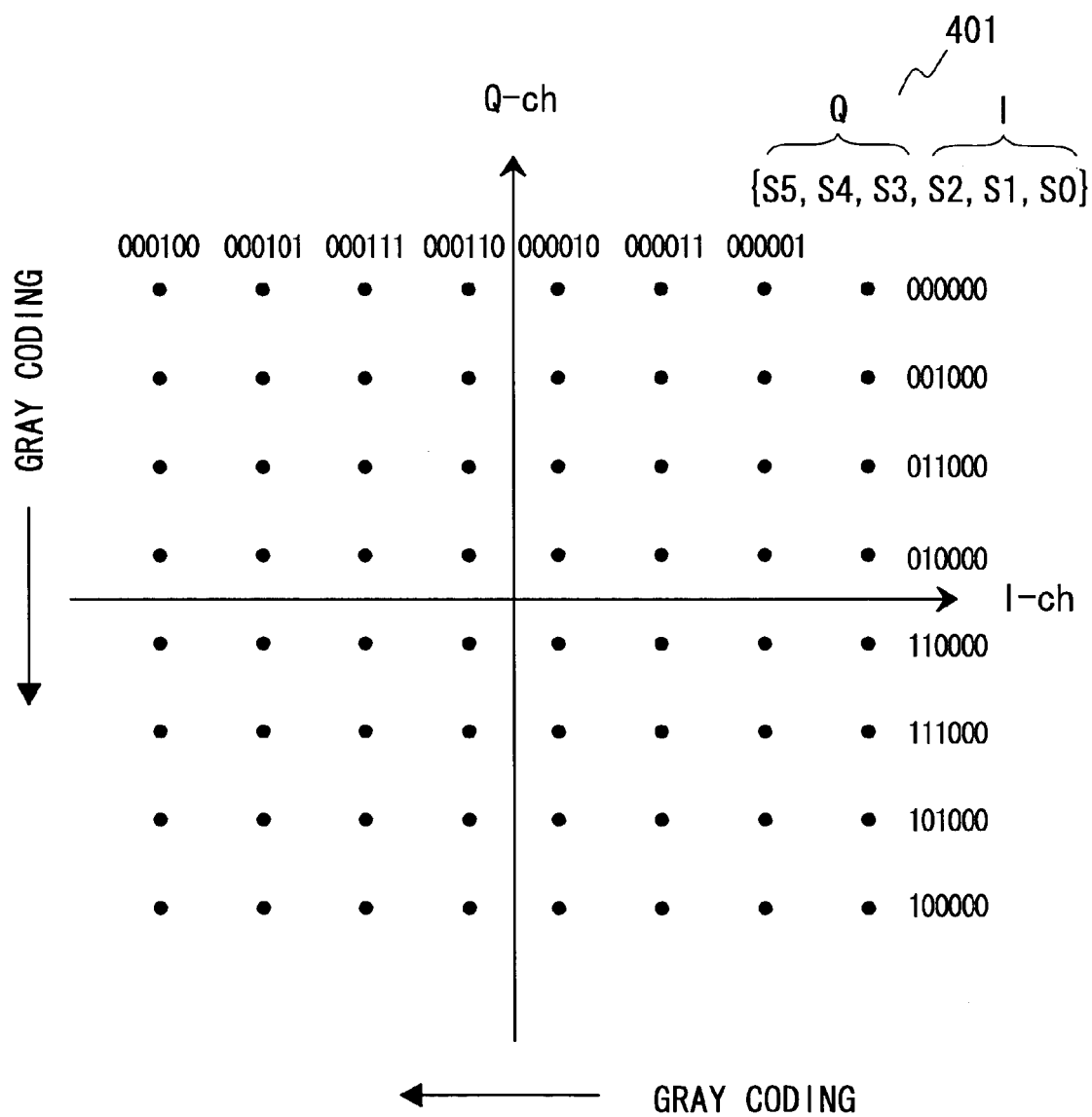

FIG. 5
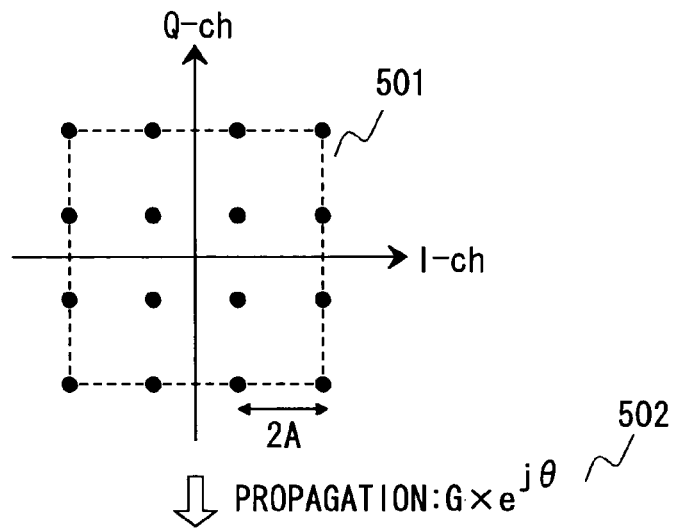
⇩ PROPAGATION: $G \times e^{j\theta}$  502
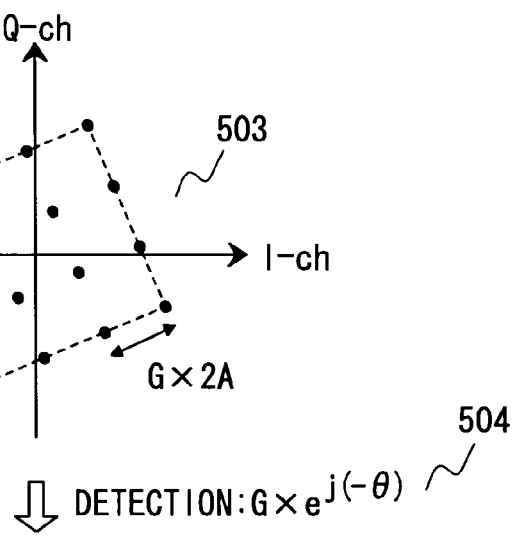
⇩ DETECTION: $G \times e^{j(-\theta)}$  504
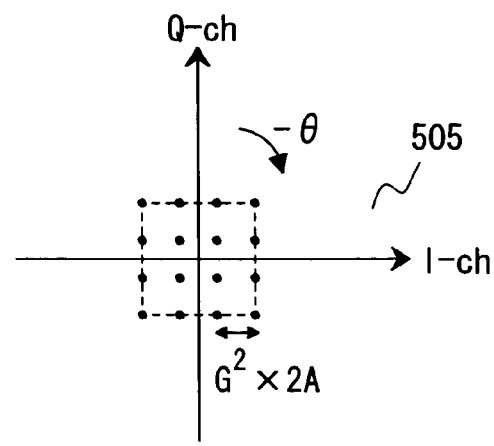

FIG. 7
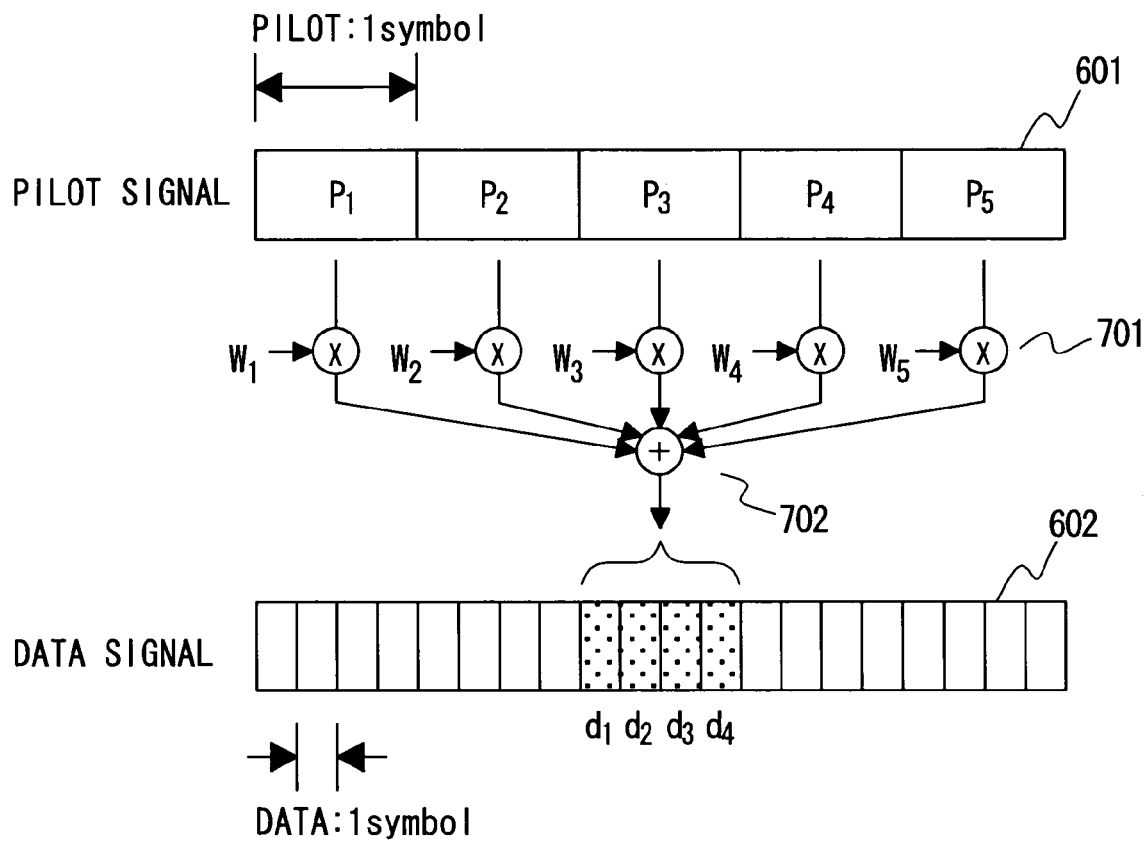
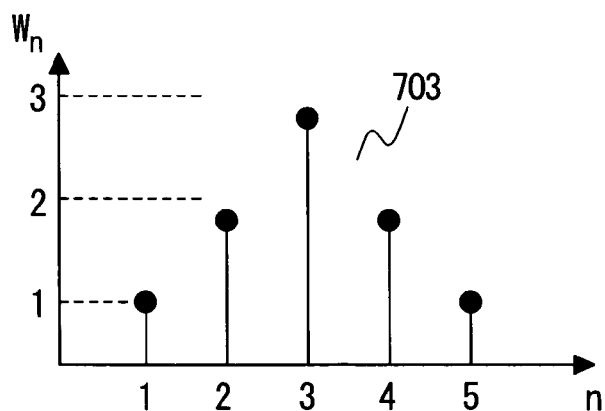

FIG. 9
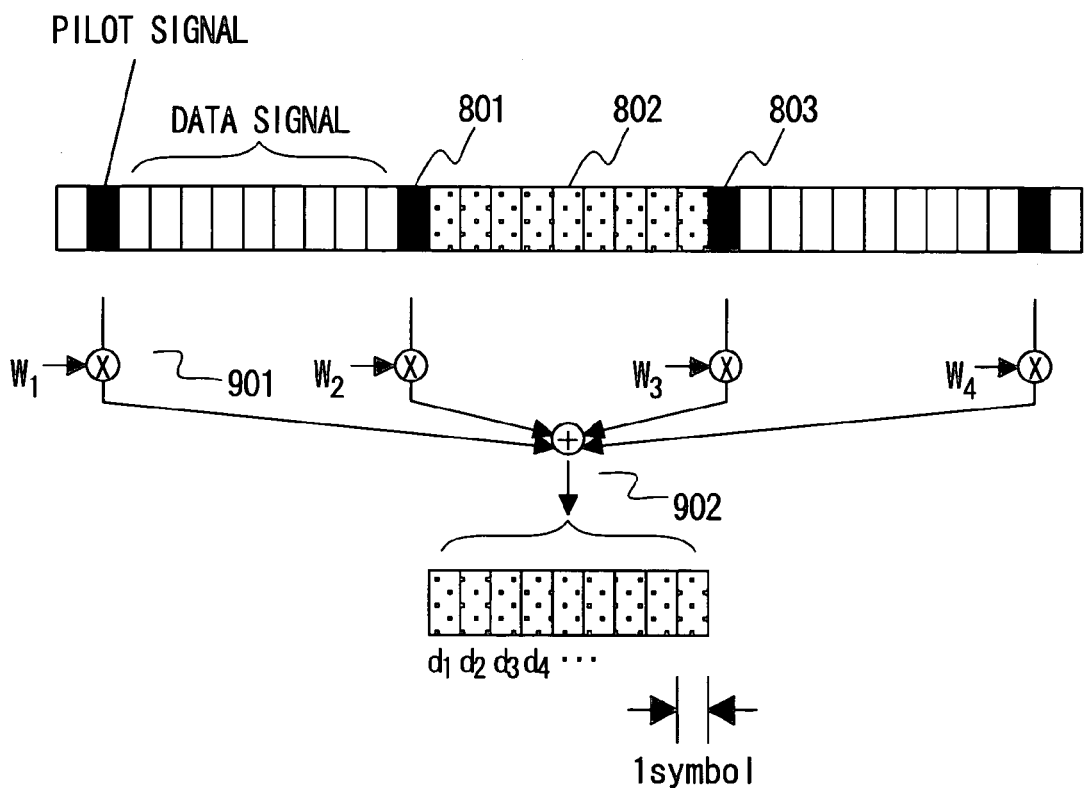
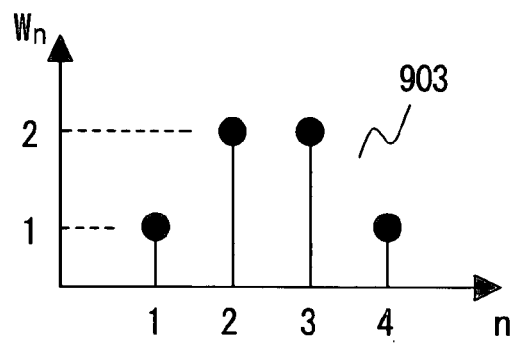

FIG. 14
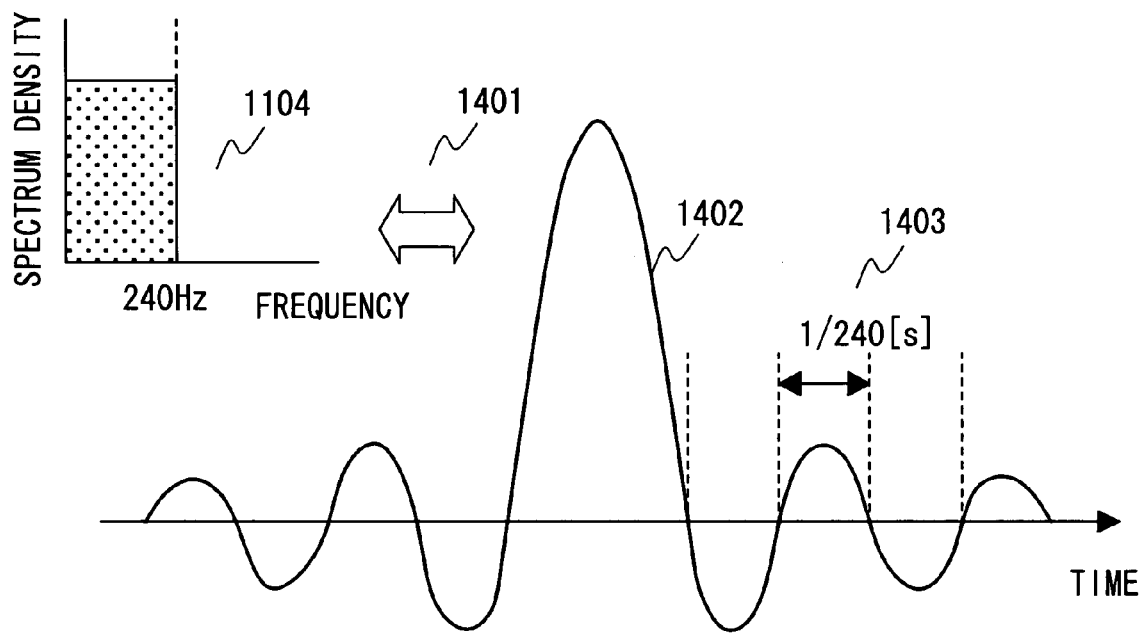
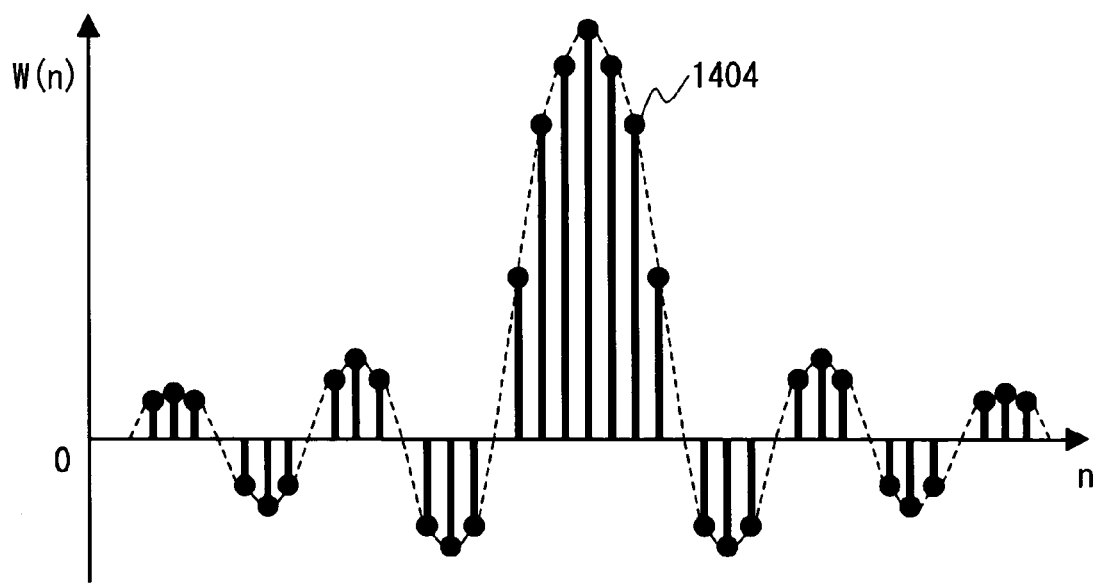

FIG. 18
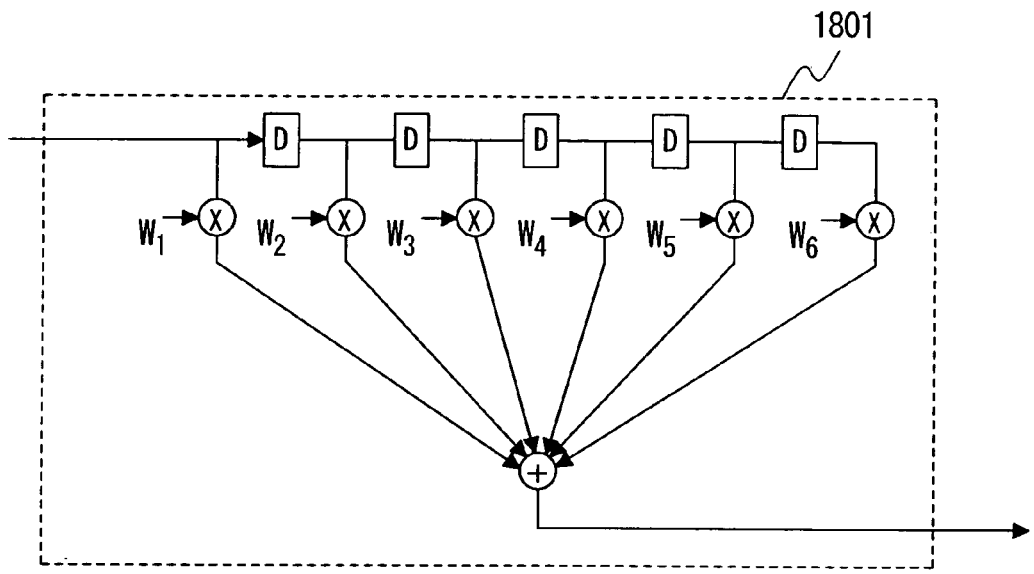
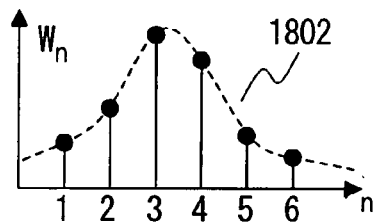
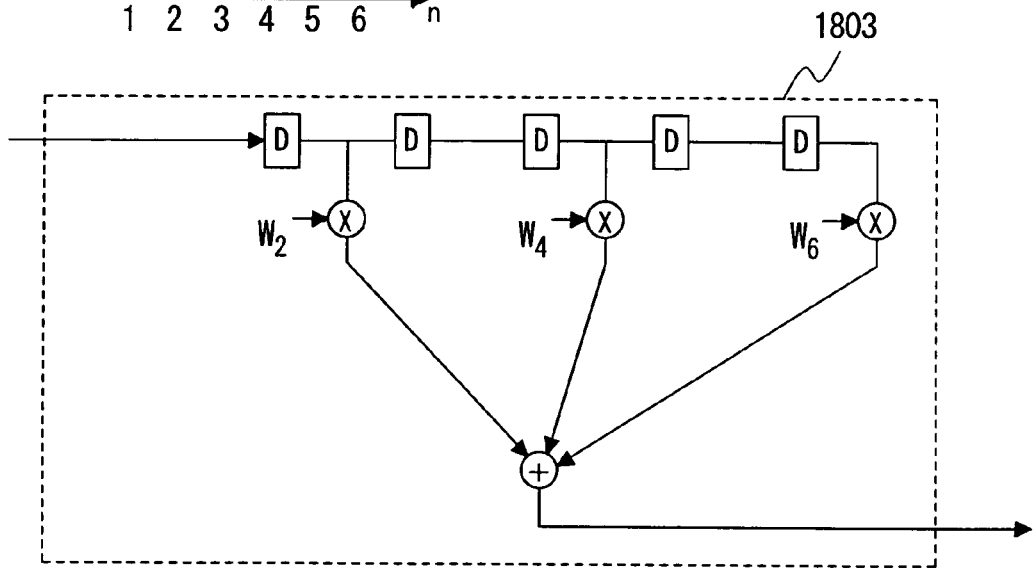
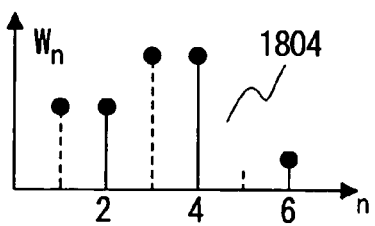

US 7,158,770 B2

CHANNEL ESTIMATION METHOD FOR A MOBILE COMMUNICATION SYSTEM

FIELD OF THE INVENTION

The present invention particularly relates to an ideal channel estimation method for a communication apparatus at a receiving end, which is used with a wireless communication system.

BACKGROUND OF THE INVENTION

FIG. 2 illustrates the configurations of wireless communication apparatuses and wireless communication system to which the present invention applies. A wireless communication system comprises a wireless communication apparatus at a transmitting end 201 and a wireless communication apparatus at a receiving end 202 and provides phone calls and data transmissions via a radio propagation path 203. Although FIG. 2 and subsequent figures depict only one of two links, such as a downlink, the present invention is equally applicable to both an uplink and downlink.

In the communication apparatus at a transmitting end 201, the data to be transmitted is first encoded by a encoder 207 in a transmitter 205. For wireless communication, convolutional coding and turbo coding are frequently used. Encoded information is entered into a QAM (Quadrature Amplitude Modulation) modulator 206 and modulated. A baseband signal derived from modulation is converted to a radio-frequency band signal by a radio unit 208 and then transmitted. In the wireless communication apparatus at a receiving end 202, on the other hand, a radio signal received from the radio propagation path 203 via antenna 210 is converted to a baseband signal by a radio unit 215. The baseband signal is first demodulated by a QAM demodulator 213 in a receiver 211 and then decoded by a decoder 214. In the QAM demodulator 213, a demodulation process is performed in accordance with the channel estimation result produced by a channel estimator 212.

As regards encoding for the wireless communication apparatus at a transmitting end, it is assumed, as shown in FIG. 3, that a turbo coding method is employed at a code rate (R) of ⅓ and at a constraint length (K) of 4 (dotted lines apply for trellis termination only). Turbo coding is defined as a third-generation mobile communication coding method by 3GPP ($3^{rd}$ Generation Partnership Project) Specification TS 25.212 and one of the widely used coding methods.

In a QAM modulator of the wireless communication apparatus at a transmitting end, long-studied multilevel modulation (QAM modulation) is conducted in order to increase the transmission efficiency. In the case of 64-QAM, 6 bits can be transmitted per symbol. As shown in FIG. 4 (401), 6 bits (S5, S4, S3, S2, S1, and S0) are grouped into a 3-bit (S2, S1, and S0) in-phase component (I component) and a 3-bit (S5, S4, and S3) quadrature component (Q component). Gray coding is conducted so that the difference between adjacent symbols is 1 bit. Transmission takes place with the signal constellation shown in FIG. 4 employed.

In a radio propagation path, the QAM-modulated outgoing signal is affected by a combination of amplitude variation and phase rotation, which is unique to a radio propagation and called "fading". To achieve proper demodulation and decoding in the wireless communication apparatus at a receiving end, it is therefore necessary to estimate such a variation correctly as indicated in FIG. 5. It is assumed that the QAM signal whose signal constellation is as shown in 501 is transmitted and subjected to fading having an amplitude variation of G and a phase rotation of θ as shown in 502. The resulting signal constellation is as shown in 503. At the receiving end, the pilot signal or other signal transmitted for channel estimation is used to estimate the amplitude variation G and phase rotation θ in the channel. Further, the complex conjugates of the obtained channel estimation result are multiplied together to implement −θ rotation and provide phase rotation correction as shown in 505. For a QAM or other signal on which information is superposed in the direction of the amplitude as well, it is also necessary to properly estimate the value of amplitude variation G for demodulation purposes.

To achieve channel estimation described above, the pilot signal for channel estimation is generally prepared separately from a data signal, which carries information. The pilot signal is characterized by the fact that the signal receiving end knows what type of signal is transmitted. Therefore, the received pilot signal itself indicates the channel situation. If, for instance, the pilot signal has a signal constellation of (1,0) or is expressed as 1×exp(j0), the received signal is G×exp(jθ). It is obvious that the received signal indicates the channel condition. When a signal whose quadrature component only is subjected to positive/negative inversion is generated from the received signal, the resulting signal is G×exp(−jθ). It is therefore easy to obtain a signal that is required for invoking (−θ) rotation, which is necessary for demodulation.

There are two pilot signal transmission methods. One method provides parallel transmission as shown in FIG. 6 and simultaneously transmits a data signal and pilot signal on separate communication channels. The other method, which is shown in FIG. 8, uses the same communication channel for a data signal and pilot signal while periodically inserting a pilot signal.

Channel estimation will now be described in detail while explaining how the use of a pilot signal value is timed.

When a first pilot signal is transmitted in parallel with a data signal as shown in FIG. 6, the number of data received within the same period of time varies because the data signal transmission rate is higher than that of the pilot signal. In the example shown in FIG. 6, one square corresponds to one signal symbol. While one symbol of the pilot signal $P_3$ (601) is received, four symbols ($d_1$, $d_2$, $d_3$, and $d_4$) of a data signal (602) are received. Therefore, the simultaneously received pilot signal $P_3$ is used as the channel estimation result for demodulating the four symbols ($d_1$, $d_2$, $d_3$, and $d_4$). Thus, the received $P_3$ is used as the channel estimation result.

If the channel is affected by fading, noise, or the like at the time of P3 when the channel estimation method shown in FIG. 6 is used, the communication quality may deteriorate due to improper channel estimation. To avoid this problem, a method shown in FIG. 7 is used. When this method is used, a plurality of pilot signals prevailing before and after an estimation time are weighted as shown in 701 and added together (702) for use as the channel estimation result. In this case, however, simple weighting coefficients, such as W1:W2:W3:W4:W5=1:2:3:2:1, are used so as to merely give greater weighting coefficients to signals closer to a data signal (703).

If, on the other hand, pilot signals are periodically inserted using the same channel as shown in FIG. 8, the pilot signals 801, 803 exist before and after a data signal 802. Therefore, the intended purpose can easily be achieved by calculating the average value of the pilot signals 801, 802 and applying the average value, as the channel estimation result, to the entire data signal 802 between the pilot signals 801, 803.

If the pilot signals are affected by fading, noise, or the like during the use of the channel estimation method shown in FIG. 8, the communication quality may deteriorate due to improper channel estimation. To avoid this problem, a method shown in FIG. 9 can be used. This method weights a plurality of pilot signals prevailing before and after an estimation time as shown in 901 and adds them together (902) for use as the channel estimation result. In this case, however, simple weighting coefficients, such as W1:W2:W3:W4=1:2:2:1, are used so as to merely give greater weighting coefficients to signals closer to a data signal (903). An example of "W1:W2:W3:W4=1:2:2:1" use is introduced in "Channel Estimation Scheme using the Plural Pilot Blocks for DS-CDMA Mobile Radio" (Ando, et al; Institute of Electronics, Information and Communication Engineers Report RCS96-72).

The feature of the channel estimation methods described above is that the channel estimation result derived from the information about one or more pilot signals is applied to the demodulation of a plurality of data signals (symbols). When a conventional channel estimation method is used with a QAM or other modulation method by which the amplitude and phase carry information, highly accurate channel estimation results are required for demodulation as well. Therefore, if the same channel estimation result is used for a plurality of data signals (symbols), the communication quality significantly deteriorates due to incorrect channel variation estimation.

Further, even if a conventional method is used to achieve channel estimation by weighting pilot signals prevailing at a plurality of times, there are no quantitative calculation grounds for weighting coefficients. Therefore, if the coefficients are improperly set, the communication quality may seriously deteriorate.

As the speed of information transmission in a wireless communication system increases, an increasing number of systems employ the QAM method as a modulation method for the purpose of enhancing the frequency use efficiency. Under these circumstances, it is therefore an object of the present invention to provide a channel estimation method for estimating a channel efficiently and accurately and establishing communication at high quality, that is, providing communication with excellent error rate characteristics.

SUMMARY OF THE INVENTION

To achieve the aforementioned object, the present invention improves characteristics by calculating the channel estimation results variously for all data signal symbols and using them for demodulation. To accomplish the object, the present invention also pays attention to the frequency characteristics of fading in a radio propagation path and enhances the accuracy in channel estimation result calculation by eliminating the thermal noise that would increase the estimation error.

BRIEF DESCRIPTION OF THE DRAWINGS

FIG. 4 illustrates a signal constellation for 64-QAM, which is one QAM scheme;

FIG. 5 illustrates how fading and detection changes a QAM outgoing signal;

FIG. 7 illustrates a conventional channel estimation method that uses pilot signals prevailing at a plurality of times in situations where pilot signals are transmitted in parallel with data signals;

FIG. 9 illustrates a conventional channel estimation method that uses a plurality of pilot signals prevailing over a wide range of time in situations where pilot signals and data signals are subjected to time-division transmission;

FIG. 14 illustrates weighting coefficients for use in the third and fourth embodiments of the present invention;

FIG. 18 illustrates a fifth embodiment of a channel estimation method according to the present invention.

DETAILED DESCRIPTION OF THE PREFERRED EMBODIMENTS

First Embodiment

To achieve the object described above, the present invention uses a pilot signal sampling frequency that is equivalent to the data signal transmission rate (symbol rate), and uses a single pilot signal or a plurality of weighted pilot signals to achieve channel estimation for each data signal symbol. More specifically, the present invention estimates the data signal's amplitude variation or phase rotation during propagation.

Figure 10:
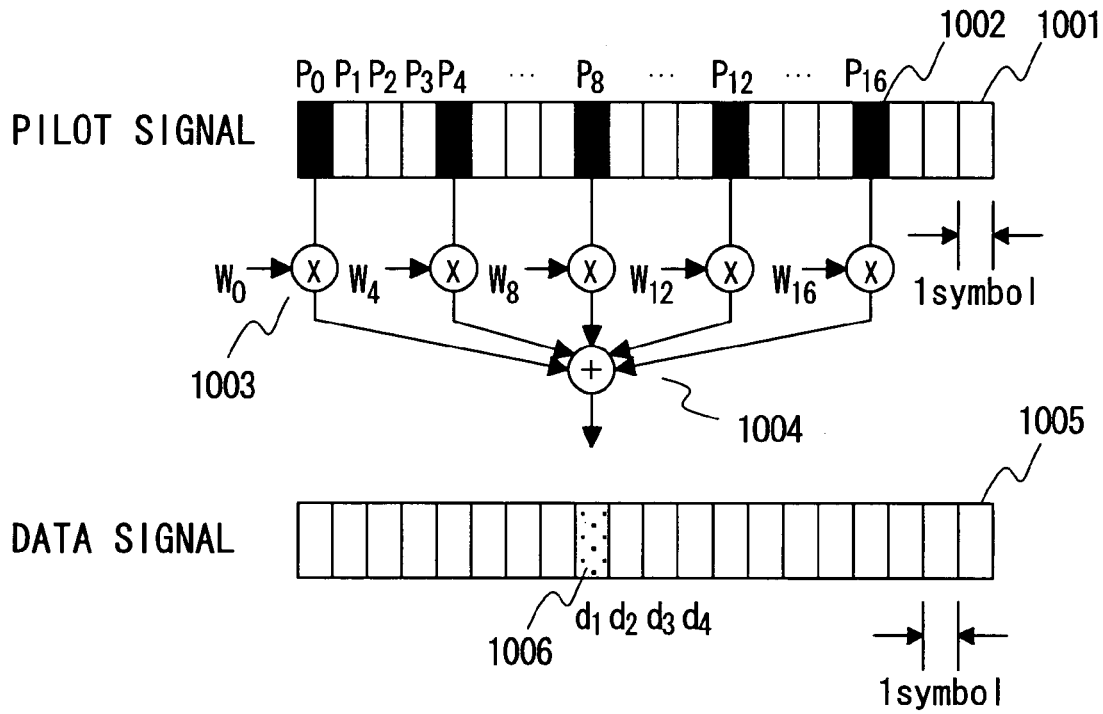
FIG. 10 illustrates a first embodiment of a channel estimation method according to the present invention.

Pilot signals (P0, P1, P2, P3, P4, . . . ) 1001 are transmitted or sampled at the same transmission rate (symbol rate) as for data signals 1005. In FIG. 10, the pilot signals P0, P4, P8, P12, and P16 (1002), which picked up at 4-symbol intervals, are multiplied by weighting coefficients (1003) and added together (1004) to calculate the channel estimation result for a certain symbol d1 (1006) within the data signals 1005. An alternative is to use only pilot signal P8, which is received at the same or closest time, for calculating the channel estimation result. It is generally believed that a pilot signal received at substantially the same time and via the same propagation path as for the data signal symbols to be detected should be used as the pilot signal for use in channel estimation. When the pilot signals for a plurality of symbols before and after the above-mentioned time are used, high-precision channel estimation can be achieved. While the timing relationship between one data symbol and the pilot signal used for channel estimation of the data symbol is fixed, the channel estimation result for data symbol d2 (1010), which is next to data symbol d1 (1006), is calculated by similarly multiplying weighting coefficients (1008) using pilot signals P1, P5, P9, P13, and P17 (1007) and adding them up (1009).

When the above channel estimation method is used, the channel estimation result can be calculated variously for all data signal symbols. As a result, the communication quality characteristics (error rate characteristics) can be improved.

Second Embodiment

In a second embodiment, a received pilot signal is used as an input and allowed to pass through a low-pass filter (LPF) for the purpose of enhancing the channel estimation accuracy. The second embodiment will now be described in detail.

In a radio propagation path, fading occurs in which the amplitude and phase drastically change (a sort of noise). When this phenomenon is expressed in terms of a frequency region, no frequency components exceed the maximum Doppler frequency ($=f_d$). The maximum Doppler frequency is proportional to the carrier wave frequency and mobile station's moving speed. If, for instance, the carrier wave frequency is 2 GHz and the mobile station's movement speed is 120 km/h, the maximum Doppler frequency ($f_d$) is substantially equal to 240 Hz (equivalent to 240 bps) so that the substantial spectral density is as indicated by 1101 in FIG. 11.

Meanwhile, the data transmission rate of, for instance, the third-generation cellular phone is 384 kbps. The transmission rate used in an actual radio propagation path is one order of magnitude higher. In an example shown in FIG. 11, the data transmission rate is set at 289.5 kHz for simulation purposes (1103). In this case, however, a rate of 289.5 kbps is more than 1200 times higher than an $f_d$ value of 240 Hz.

Figure 12:
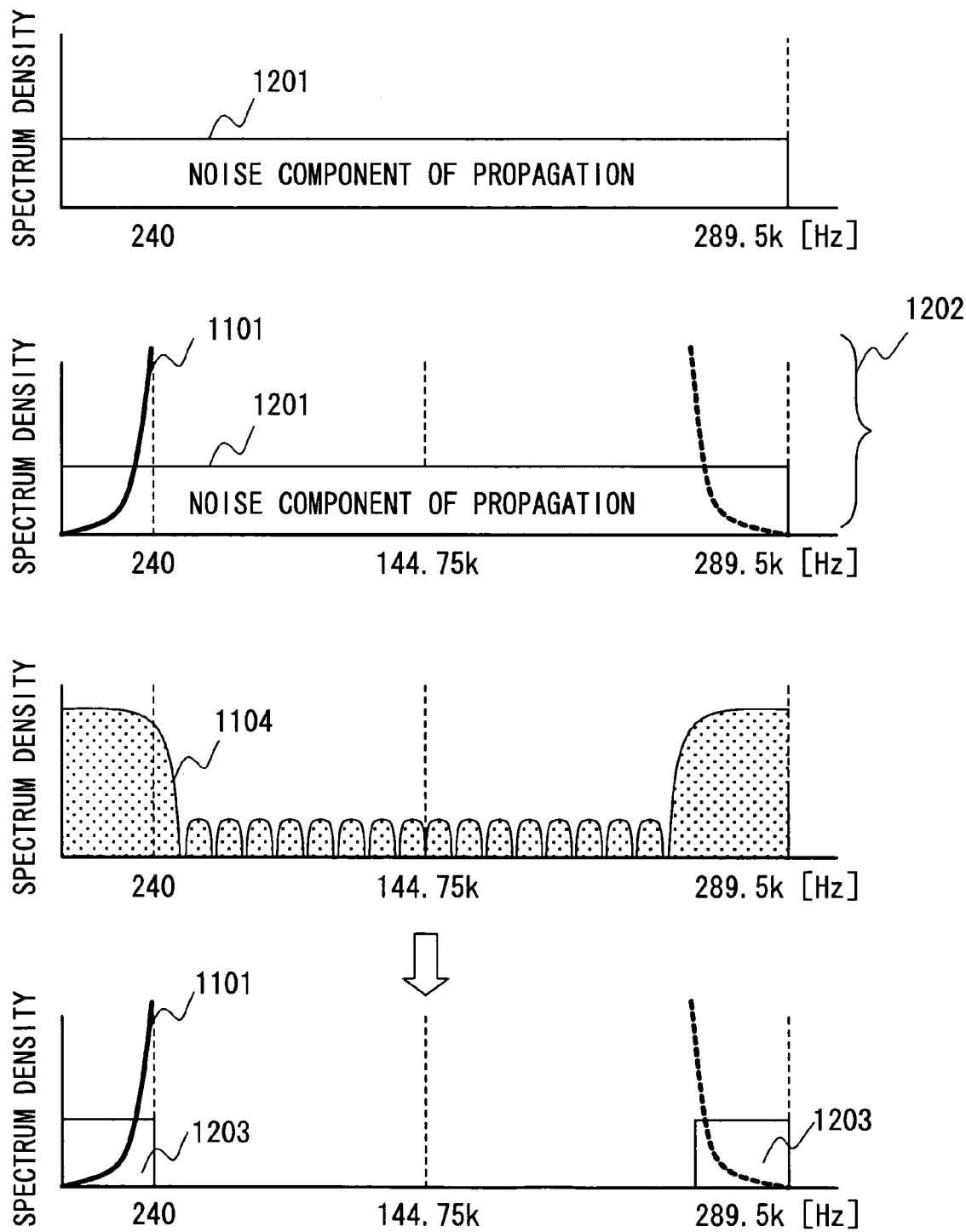
FIG. 12 illustrates how a low-pass filter is used for high-precision fading estimation in a second embodiment of the present invention.

During propagation, however, thermal noise (white noise), which is proportional to the bandwidth of a radio propagation path, is applied in addition to the above-mentioned fading as indicated by 1201 in FIG. 12. Conventional channel estimation is conducted while a broadband noise component 1201 is added to fading-induced amplitude variation and phase rotation (1202). However, the fading does not have a component having a frequency higher than the maximum Doppler frequency as described earlier. Therefore, when a pilot signal is allowed to pass a low-pass filter having a passband for passing components having a frequency lower than the maximum Doppler frequency as indicated by 1104, the fading signal passes through as is, but the majority of thermal noise within the remaining band is eliminated. It is needless to say that the thermal noise existing within the fading frequency region remains without being eliminated (1203). However, when compared to the entire thermal noise initially applied during propagation, the amount of the remaining thermal noise can be considered extremely small because the data transmission rate is high and the fading is one order of magnitude later (the above filter can reduce the amount of thermal noise to about 1/600 in the above example in which the value fd is 240 Hz and the transmission rate is 289.5 kbps). When a low-pass filter appropriate for the maximum Doppler frequency of a fading invoked during propagation is applied to a pilot signal used for channel estimation as described above, it is possible to eliminate unnecessary noise and achieve channel estimation with high accuracy.

Third Embodiment

Figure 13:
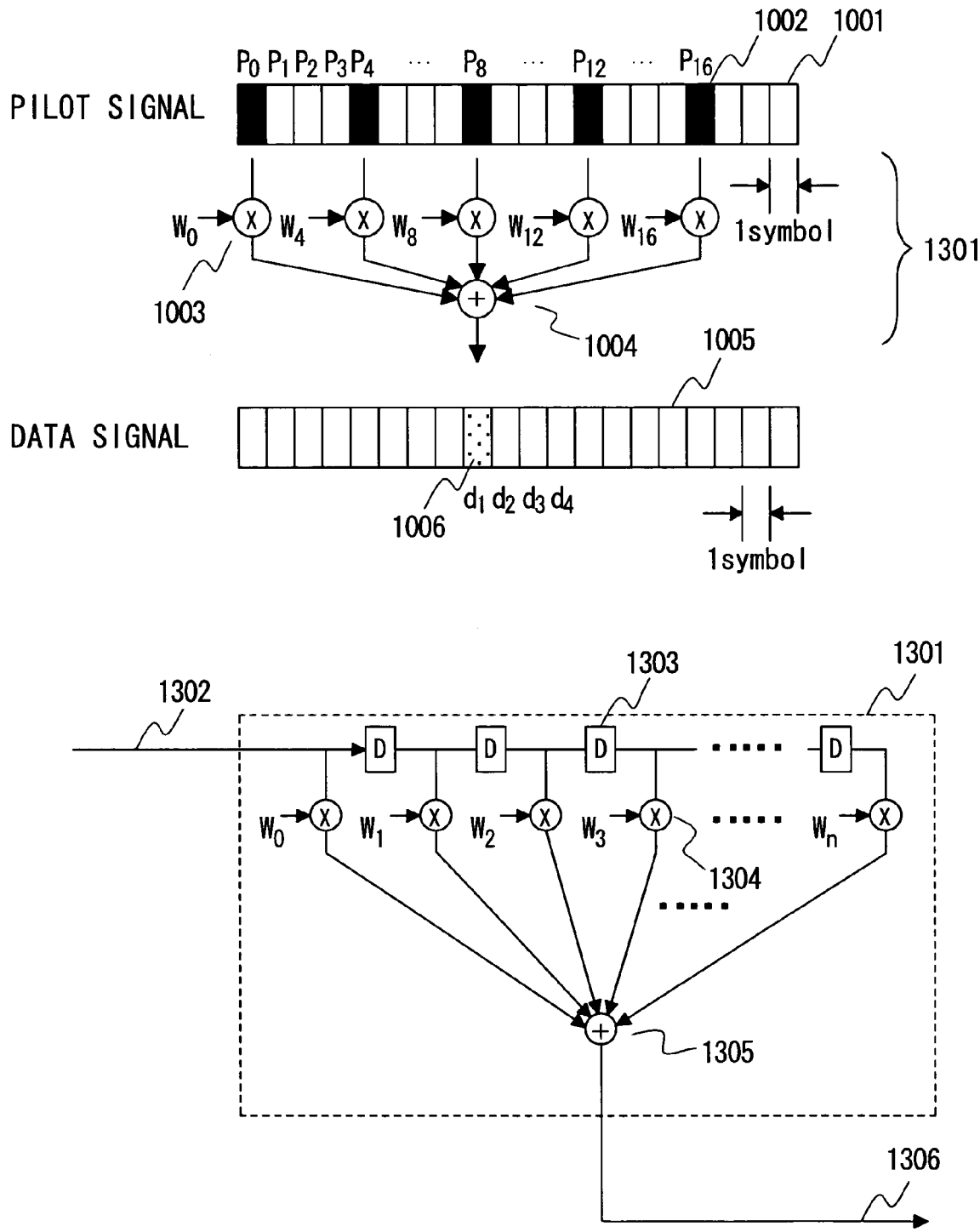
FIG. 13 is a block diagram illustrating a third embodiment of a channel estimation method according to the present invention.

The description of a third embodiment relates to the configuration of a low-pass filter that is used in the second embodiment. For calculating the channel estimation result, which varies from one data signal symbol to another as mentioned in the description of the first embodiment, the pilot signal transmission or sampling intervals are the same as those for the data signal. In the first embodiment, pilot signals at a plurality of times are weighted and added together. However, the simplest method for achieving this object is the use of an FIR filter 1301 shown in FIG. 13. The FIR filter comprises a plurality of delay devices 1303, multipliers 1304 for multiplying weighting coefficients for respective data, and an adder 1305 for adding up the obtained multiplication results. As shown in FIG. 14, various FIR filter coefficients are set as weighting coefficients in accordance with an impulse response 1402, which is determined by a Fourier transform of desired low-pass characteristics 1104 (1404). It can be said that the FIR 1301 is used to form a low-pass filter having frequency characteristics 1104. One feature of the present invention is that the weighting coefficients are set so as to provide low-pass filter characteristics appropriate for channel variations. When attention is given to the weighting coefficient values, another feature of the present invention is that negative weighting coefficient values may be used as indicated by 1404 in FIG. 14.

Fourth Embodiment

A fourth embodiment uses the Nyquist Theorem to perform channel estimation result calculations with high accuracy. In the fourth embodiment, the channel estimation accuracy attained when the pilot signal sampling rate is lower than the data transmission rate (data signal symbol rate) is equal to the accuracy attained when the pilot signal sampling rate is the same as the data transmission rate. The fourth embodiment will now be described in detail.

Figure 11:
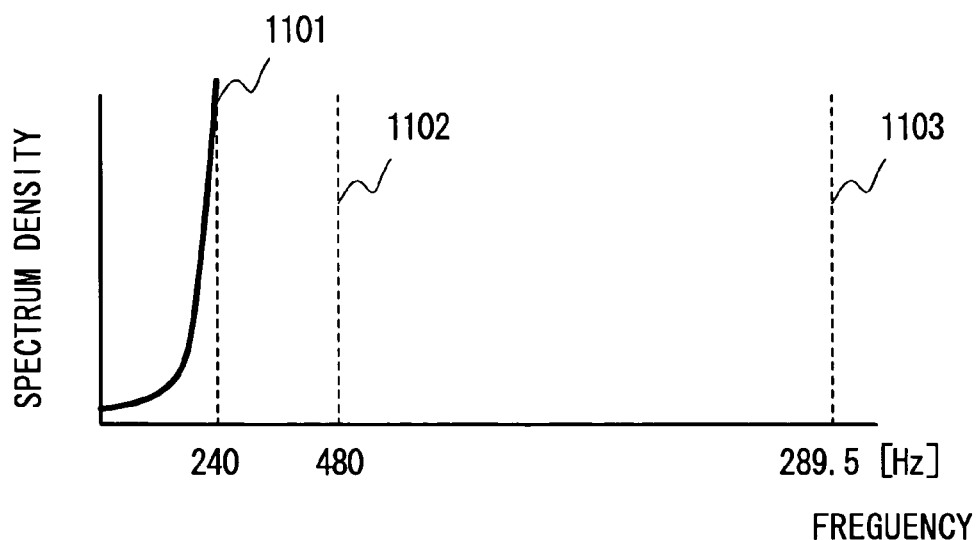
FIG. 11 is a graph showing a frequency spectrum of fading during propagation.
Figure 15:
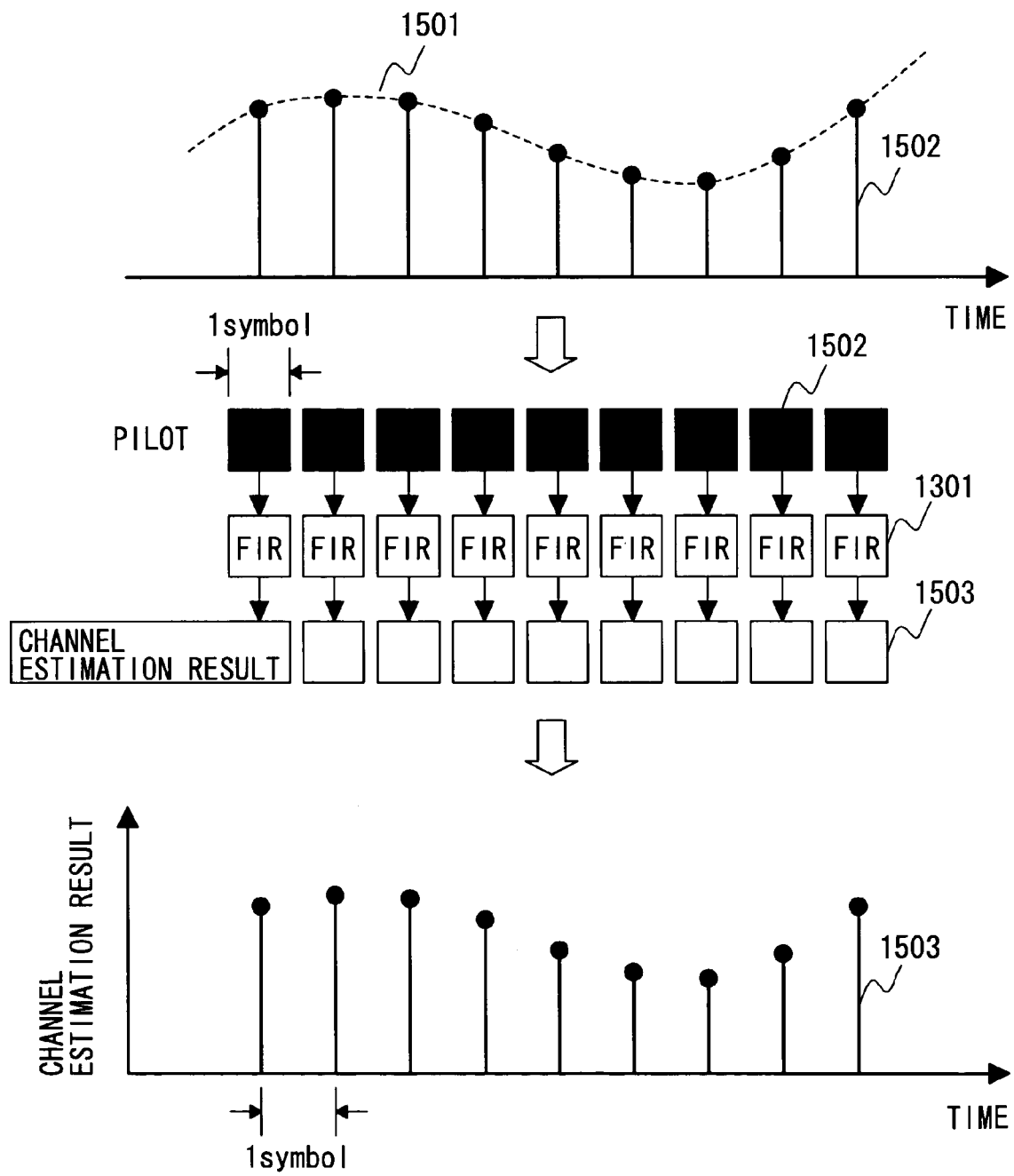
FIG. 15 illustrates the relationship between pilot signal sampling intervals and channel estimation intervals in the third embodiment of the present invention.

According to the Nyquist Theorem, the original signal can be reproduced when the sampling frequency is more than two times the maximum frequency of the original signal. When sampling is conducted at 480 Hz (equivalent to 480 bps) or higher in the case of a fading in which the value $f_d$ is 240 Hz 1102 as shown in FIG. 11, the fading can be theoretically reproduced. The case indicated in FIG. 11 satisfies the Nyquist Theorem's conditions because the data transmission rate is 289.5 kbps (1103). The third embodiment described earlier also satisfies the Nyquist Theorem when the pilot signal sampling intervals are rendered equal to the data transmission rate, as indicated in FIG. 15. The pilot signal 1501 is sampled at a sampling frequency equivalent to the data transmission rate 1502, and an FIR filter 1301 is operated to pass a frequency region appropriate for fading in order to calculate a channel estimation result 1503 at intervals equivalent to the data transmission rate.

When the maximum Doppler frequency $f_d$ for fading is 240 Hz, the operation of the third embodiment permits signal reproduction when sampling is conducted at a rate of 480 Hz or higher. However, the data transmission rate is as high as 289.5 kbps. In this case, the pilot signal sampling rate can be reduced to about two times the maximum Doppler frequency without impairing the communication quality.

Figure 1:
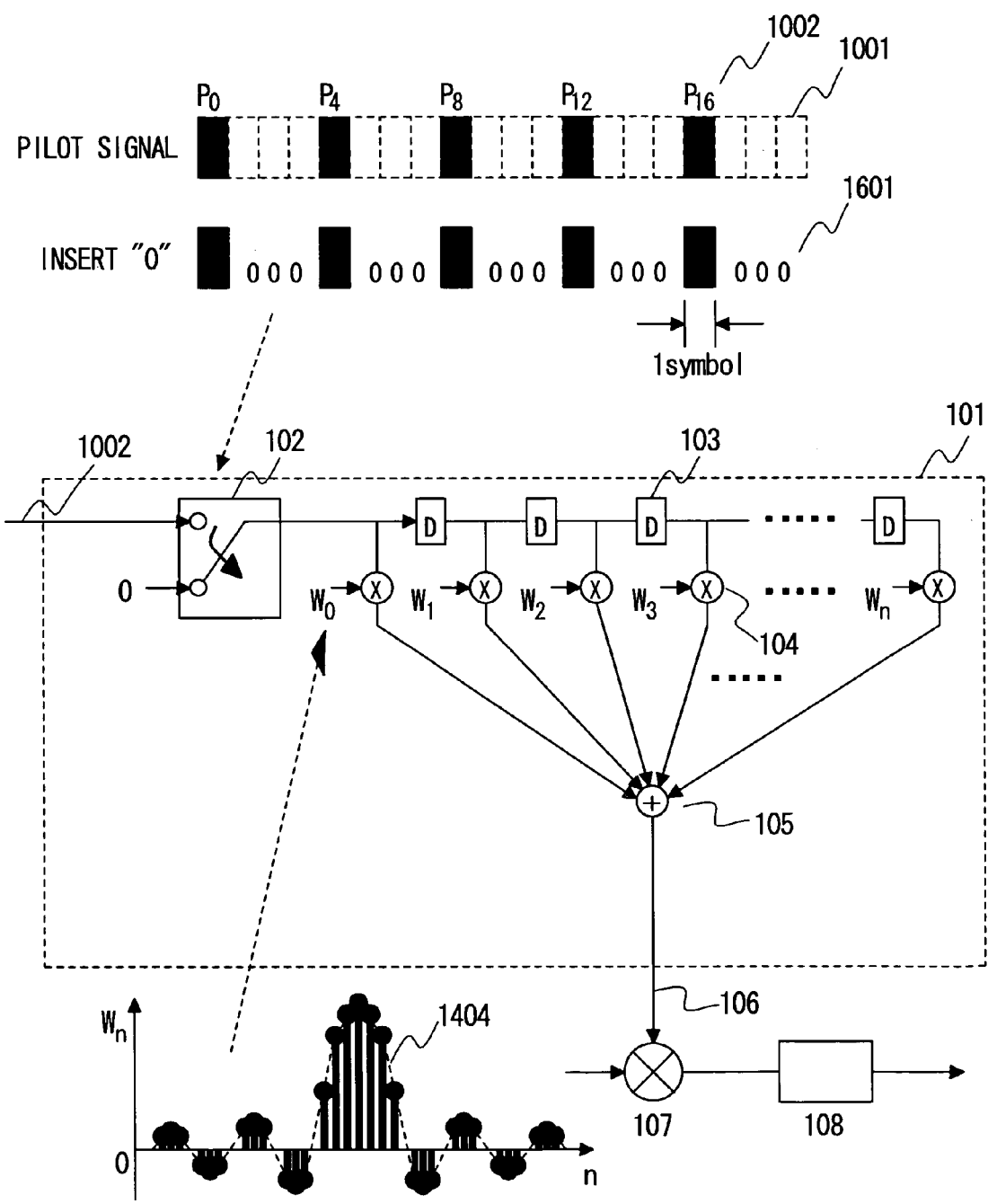
FIG. 1 is a block diagram illustrating a fourth embodiment of a channel estimation method according to the present invention.
Figure 2:
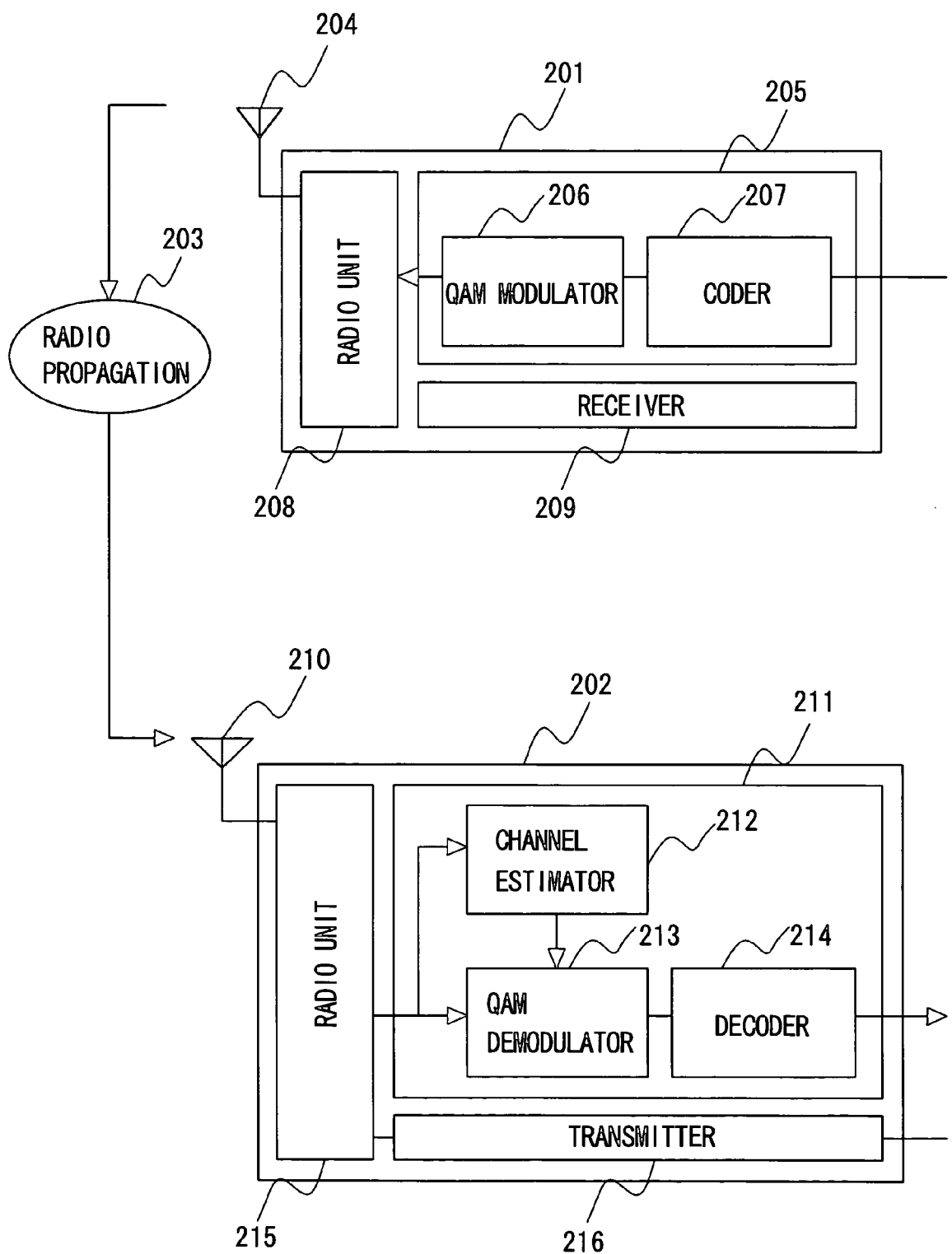
FIG. 2 illustrates a system configuration according to the present invention.
Figure 16:
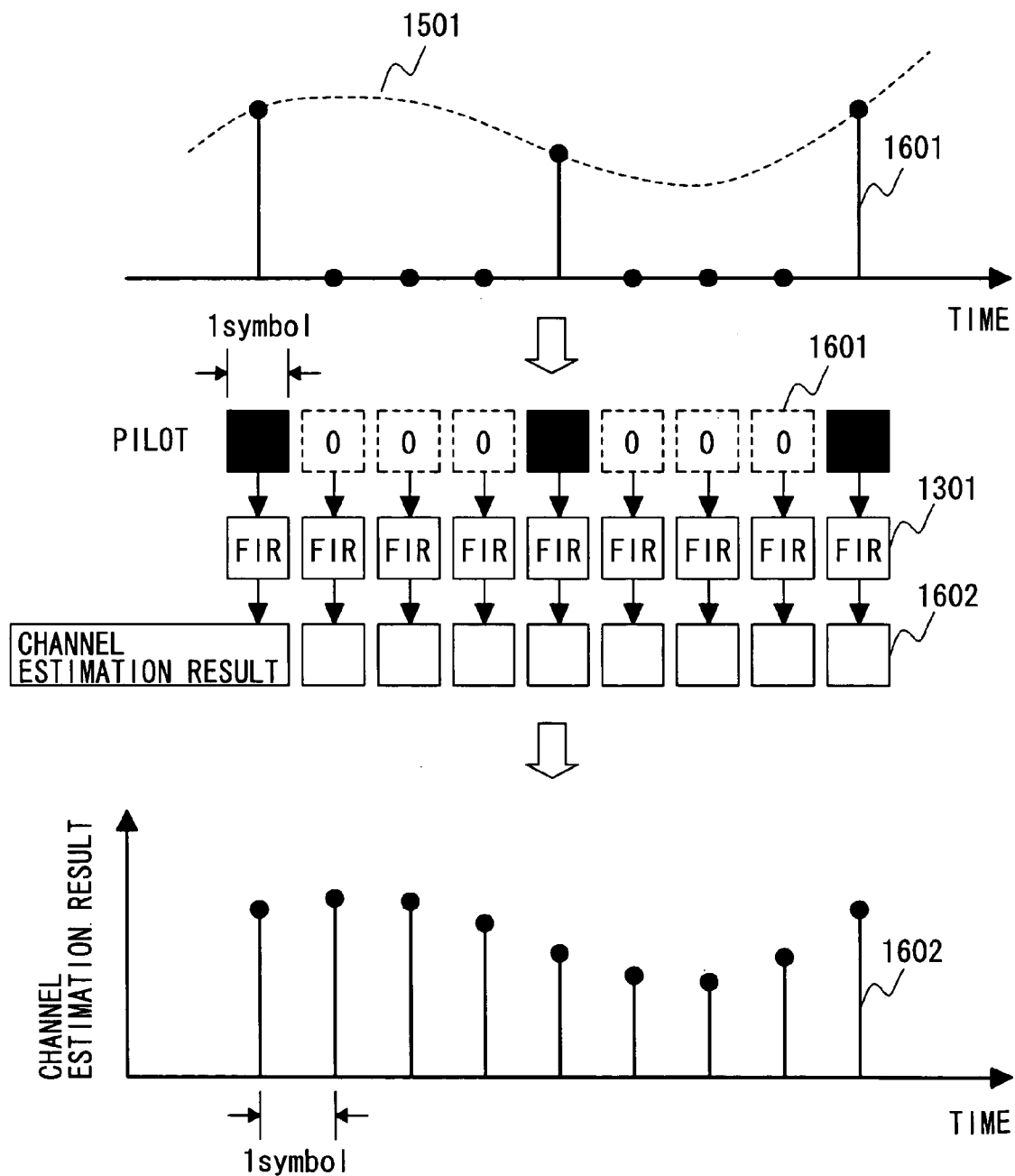
FIG. 16 illustrates the relationship between pilot signal sampling intervals and channel estimation intervals in the fourth embodiment of the present invention.

As shown in FIG. 16, therefore, the sampling rate is reduced, for instance, to ¼ the data transmission rate, that is, sampling is conducted every four data symbols, and the value "0" is inserted at the remaining three sampling times. The resulting signal 1601 is subjected to interpolation and then entered into an FIR filter that is used in the third embodiment. The data transmission rate is adequately high relative to the maximum Doppler frequency of fading. Therefore, even when the pilot signal sampling rate is reduced to ¼ the data transmission rate, the Nyquist Theorem is satisfied. Further, since the employed FIR filter is the same as used in the third embodiment, all the frequencies contained in the fading pass through. Consequently, the channel estimation result 1602, which is output as a result of the above operation, is substantially equal to the channel estimation result 1503 shown in FIG. 15. The employed channel estimation method is shown in FIG. 1. The pilot signal 1001 is sampled (1002) at a certain sampling frequency (which is, however, at least two times the maximum Doppler frequency of fading) and used as an input signal for channel estimation. Next, a switch 102 is operated so as to generate a signal 1601, into which the value "0" is inserted in accordance with the channel estimation result output intervals (=data transmission rate), and then an FIR filter provided with weighting coefficients having low-pass characteristics indicated by 1404 is operated. The FIR filter comprises a plurality of delay devices 103, multipliers 104 for performing multiplications with respective weighting coefficients, and an adder 105 for adding up the obtained multiplication results. The output 106 of the FIR filter operating at a data symbol rate becomes a channel estimation result for a data signal symbol at a specific time. Subsequently, a detector (107) uses the channel estimation result to achieve data signal detection (phase rotation correction, etc.), and a demodulator 108 demodulates the data signal that is modulated.

Figure 3:
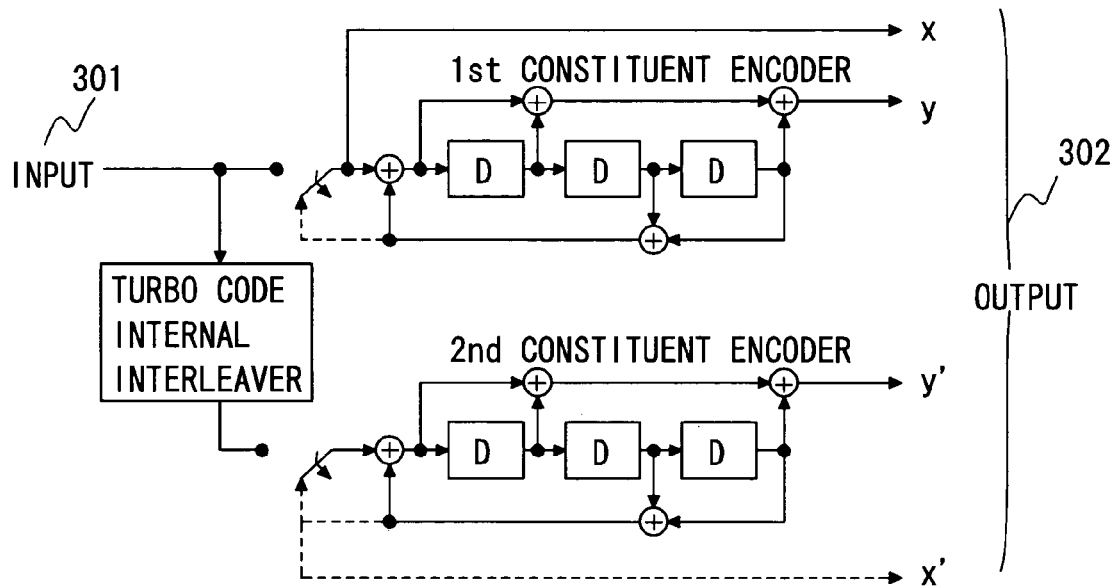
FIG. 3 is a block diagram illustrating an encoder for a turbo coding method, which is one channel encoding method.
Figure 6:
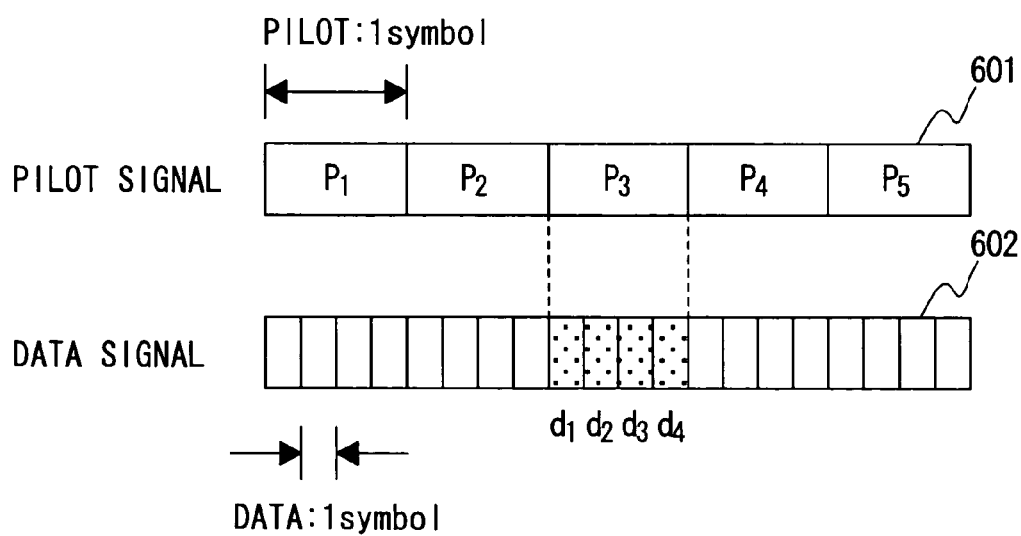
FIG. 6 illustrates a conventional channel estimation method for use in situations where a pilot signal is transmitted in parallel with a data signal.
Figure 8:
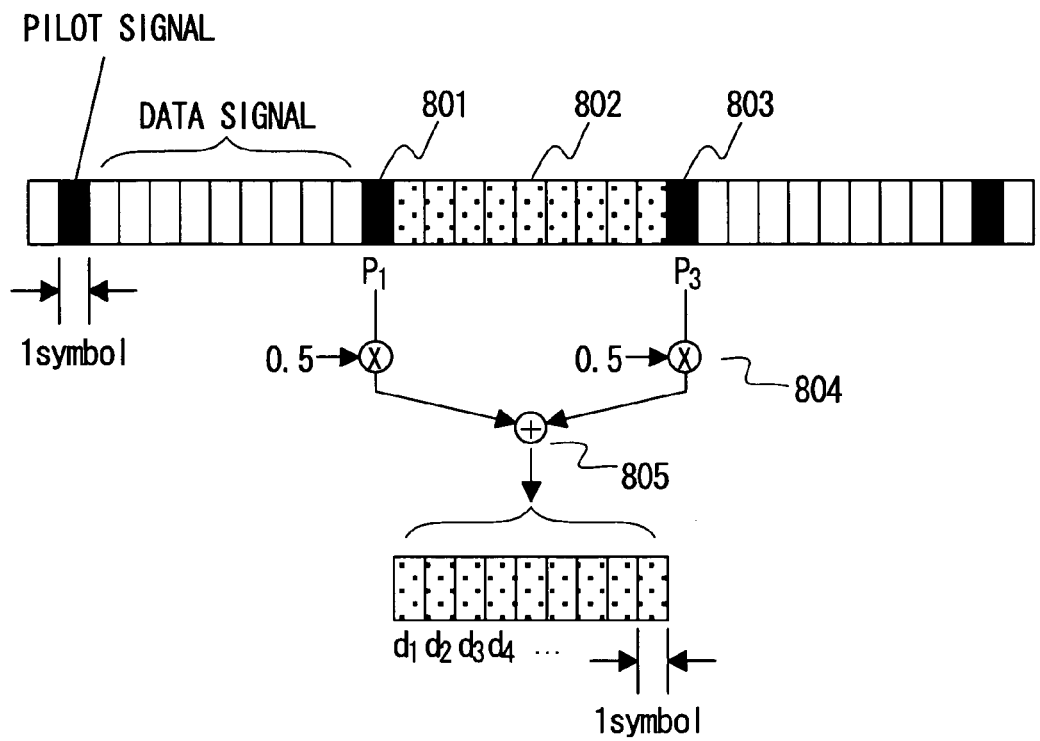
FIG. 8 illustrates a conventional channel estimation method for use in situations where pilot signals and data signals are subjected to time-division transmission.
Figure 17:
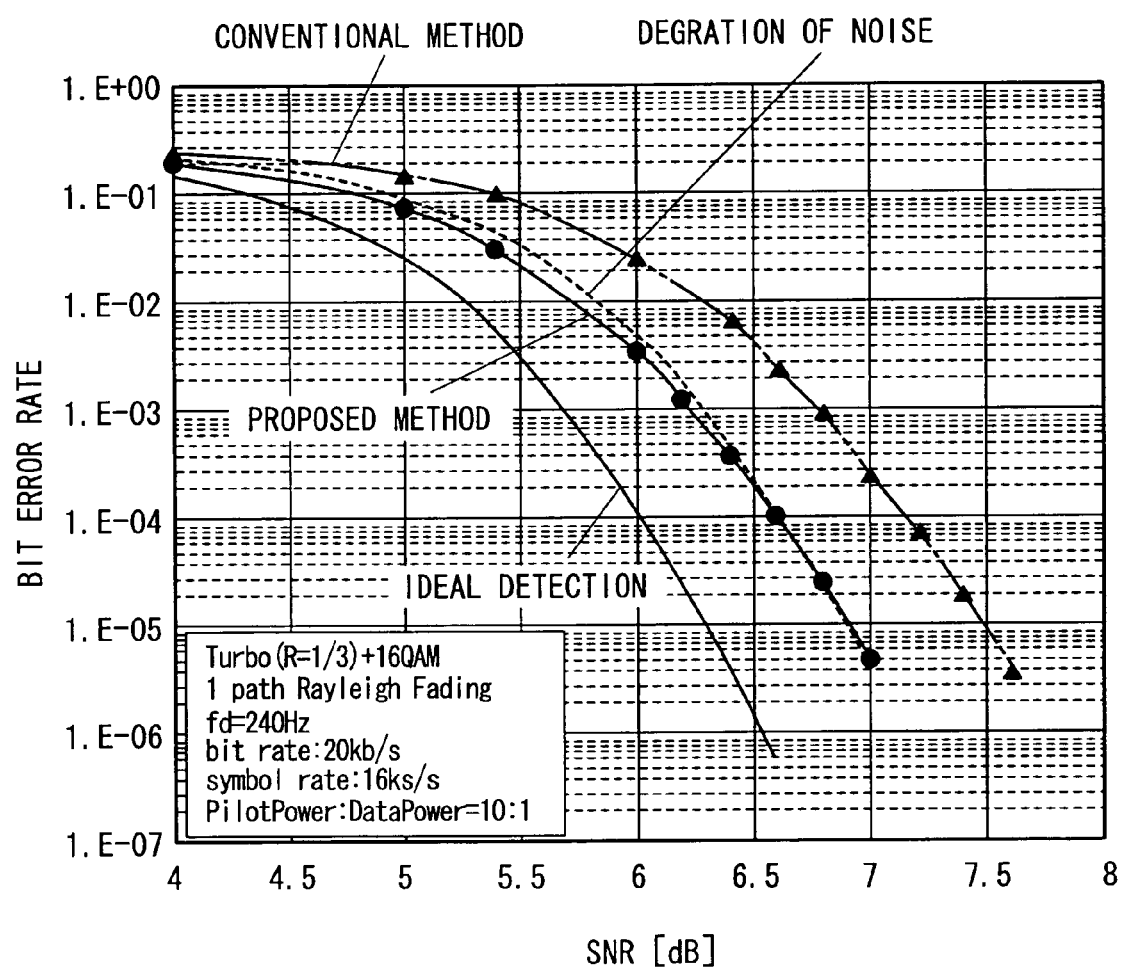
FIG. 17 is a graph showing the results of simulations that are performed using the fourth embodiment of the present invention.

The error rate characteristics prevailing when the fourth embodiment of a channel estimation method were evaluated by means of computer simulation. For simulation purposes, turbo encoding was conducted at a code rate (R) of ⅓ and at a constraint length (K) of 4 in FIG. 3, and 16-QAM multilevel modulation was conducted to perform a transmission at 20 kbps (the prevailing QAM symbol transmission rate was 16 K symbols/s). Further, the pilot signal was transmitted at 1600 Hz (1.6 kbps). It was assumed that the pilot signal power was 10 times higher than the data signal power. For channel estimation purposes, the pilot signal was sampled every ten data signal symbols, and nine 0s were inserted for agreement with the data transmission rate. A 100-tap FIR filter was used as a low-pass filter having a passband of frequencies up to 240 Hz. FIG. 17 shows the error rate characteristics prevailing when $f_d$ was 240 Hz.

The solid line represents an error rate characteristic boundary value that can be attained when ideal channel estimation is accomplished without error. If there is residual noise 1203, which cannot be eliminated by the FIR filter, the error rate characteristics deteriorate due to noise-induced error in channel estimation. The resulting deteriorated characteristics, which are indicated by the dotted line, may be interpreted as a limit that prevails when the low-pass characteristics appropriate for fading-characteristics are implemented by the FIR filter. The line with triangular marks indicates the characteristics that prevail during the use of a conventional channel estimation method disclosed by NTT Docomo in 1996. FIG. 17 reveals that the use of the present embodiment of an FIR filter having low-pass characteristics appropriate for fading characteristics introduces a characteristics improvement of about 0.2 dB over the conventional method.

Fifth Embodiment

When a multilevel modulation is conducted in a first embodiment, the employed channel estimation result varies from one data signal symbol to another in order to ensure high efficiency and accuracy in channel estimation. In the fifth embodiment, however, the channel estimation result is updated every several symbols so that the channel estimation method used in the first to fourth embodiments applies at intervals of several symbols. The channel estimation result intrinsically varies from one data symbol to another. Therefore, the characteristics deteriorate to a certain extent when the same channel estimation result is applied to several symbols. However, the frequency of channel estimation result calculation can be reduced. Further, when an FIR filter is used, the number of taps can be reduced from the viewpoint of hardware configuration (equivalent to a decrease in the number of multipliers). As a result, increased simplicity is provided as an advantage. One example is shown in FIG. 18. The example presented in FIG. 18 assumes that six taps are provided for an FIR filter 1801 for use in updating the channel estimation result for each symbol, and that the distribution of employed weighting coefficients is as indicated by 1802. Further, when it is assumed that the same channel estimation result may be used for two adjacent data symbols, the use of three multipliers suffices because the two adjacent symbols use the same weighting coefficient for multiplication. The resulting distribution is as indicated by 1804 (the dotted line in 1804 represents weighting coefficients that are equivalent to the characteristics prevailing when the number of taps is 3 and implemented when the number of taps is 6 as is the case with 1801). Although a certain degree of characteristics deterioration results from the use of different weighting coefficients, the number of multipliers in this example can also be reduced to half.

The pilot signal for use with the present invention may be either a common pilot signal for transmission from a transmitting communication apparatus to a plurality of receiving communication apparatuses or a specific pilot signal for transmission from a transmitting communication apparatus to a specific receiving communication apparatus. If pilot signal sampling is conducted at a rate lower than the data signal symbol rate as is the case with the fourth embodiment, the employed pilot signal may also be a pilot signal that is on the same channel as for data signals and periodically inserted between data signals.

Even when multilevel-modulated data is transmitted at a high speed, the present invention makes it possible to achieve channel estimation with high efficiency and high accuracy, thereby improving the communication quality characteristics.

What is claimed is:

1. A channel estimation method for a mobile communication system, in which a receiving apparatus obtains an channel estimation uses to obtain a channel estimation result for use in detection of a data signal received from a transmitting apparatus, wherein said receiving apparatus receives a data signal containing a plurality of data symbols from said transmitting apparatus, estimates a data signal channel condition for each data symbol of said received data signal and detects said received data signal for each of said data symbol in accordance with the estimation result, wherein said receiving apparatus receives a pilot signal from said transmitting apparatus and uses said pilot signal to estimate said channel, wherein said pilot signal is sampled at a rate lower than a symbol rate of said data signal, and the sampled pilot signal is interpolated into the symbol rate of said data signal using an FIR filter operating at the symbol rate of said data signal and entered into the FIR filter, and wherein the output of the filter is used as a channel estimation result.

2. The channel estimation method according to claim 1, wherein the coefficient of said FIR filter is determined in accordance with an impulse response, which is determined by a Fourier transform of predetermined low-pass characteristics.

3. The channel estimation method according to claim 1, wherein said pilot signal is on the same channel as for said data signal and inserted between the symbols of said data signal at predetermined intervals for transmission.

4. The channel estimation method according to claim 1, wherein the symbol rate of said pilot signal is equal to the symbol rate of said received data signal.

5. The channel estimation method according to claim 1, wherein said pilot signal is passed through a low-pass filter having a passband of a specified frequency and lower frequencies and used for channel estimation.

6. The channel estimation method according to claim 1, wherein said received data signal is multilevel-modulated by said transmitting apparatus.

7. A receiving apparatus in a mobile communication system, comprising:
a channel estimator for estimating the channel variation between a transmitting apparatus and the receiving apparatus in accordance with a received signal;
a detector for detecting the received signal in accordance with an estimation result produced by said channel estimator; and
a demodulator for demodulating said detected received signal,
wherein said received data signal includes a plurality of data symbols;
wherein said channel estimator is configured to perform channel estimation for each data symbol, said channel estimator operating at a data symbol rate of said received data signal; and
wherein said detector detects said received data signal for each of said data symbol.

8. The receiving apparatus according to claim 7, wherein said channel estimator estimates said channel variation using a pilot signal received from said transmitting apparatus.

9. The receiving apparatus according to claim 8, wherein said channel estimator estimates the amplitude variation or phase rotation with a propagation for said received signal in accordance with said pilot signal.

10. The receiving apparatus according to claim 8, wherein said channel estimator comprises a plurality of series-connected delay devices for delaying an entered pilot signal, a plurality of multipliers for multiplying the outputs of said plurality of delay devices by a plurality of predetermined coefficients, and an adder for adding up the outputs of said plurality of multipliers, and operates at a symbol rate of said data signal and uses the output of said adder to estimate said channel variation.

11. The receiving apparatus according to claim 10, wherein said pilot signal is entered into said channel estimator after being sampled at a rate lower than the symbol rate of said data signal, wherein said entered pilot signal is interpolated into the symbol rate of said data signal using a predetermined value, and wherein the resulting interpolated signal is entered into a plurality of delay devices.

12. The receiving apparatus according to claim 11, wherein the coefficients of said plurality of multipliers are determined in accordance with an impulse response, which is determined by a Fourier transform of predetermined low-pass characteristics.

13. The receiving apparatus according to claim 10, wherein at least one of said plurality of coefficients is a negative value.

14. The receiving apparatus according to claim 10, wherein said channel estimator comprises a plurality of series-connected delay devices for delaying an entered pilot signal, a plurality of multipliers which are smaller in number than the delay devices and used for multiplying the outputs of said plurality of delay devices by a plurality of predetermined coefficients, and an adder for adding up the outputs of said plurality of multipliers, and operates at a symbol rate of said data signal and uses the output of said adder to estimate said channel variation.

15. The receiving apparatus according to claim 8, wherein said channel estimator includes a low-pass filter for passing a pilot signal for use in said channel estimation.

* * * * *